United States Patent [19]
Greene

[11] Patent Number: 5,977,988
[45] Date of Patent: Nov. 2, 1999

[54] METHOD FOR MAPPING LINE SEGMENT INTERSECTIONS TO MACHINE REPRESENTABLE POINTS

[75] Inventor: Daniel H. Greene, Sunnyvale, Calif.

[73] Assignee: Xerox Corporation, Stamford, Conn.

[21] Appl. No.: 08/774,983

[22] Filed: Dec. 26, 1996

Related U.S. Application Data

[60] Provisional application No. 60/009,418, Dec. 29, 1995.

[51] Int. Cl.$^6$ .................................................. G06T 11/00
[52] U.S. Cl. .......................................................... 345/443
[58] Field of Search ............................ 345/433, 440–443

[56] References Cited

U.S. PATENT DOCUMENTS

| | | | |
|---|---|---|---|
| 5,506,948 | 4/1996 | Onitake et al. ........................ | 345/438 |
| 5,793,377 | 8/1998 | Moore ................................... | 345/433 |

OTHER PUBLICATIONS

Daniel H. Greene and Frances F. Yao, "Finite–Resolution Computational Geometry", *Proc. 27th Ann. Symp. on Foundations of Computer Science*, 1986, pp. 143–152.

M. Gangnet, J–C Herve, T. Pudet and J–M Van Thong, "Incremental Computation of Planar Maps", *Computer Graphics* (SIGGRAPH 1989), vol. 23, No. 3, 1989, pp. 345–354.

L. Guibas and D. Marimont, "Rounding Arrangements Dynamically", Proceedings of the 11th ACM Symposium on Computational Geometry (SCG 1995), Vancouver, B. C., Jun. 1995.

Jon L. Bentley and T. A. Ottman, "Algorithms for Reporting and Counting Geometric Intersections", *IEEE Transactions on Computers*, vol. C–28, No. 9, Sep. 1979, pp. 643–647.

K. L. Clarkson and P. W. Shor, "Applications of Random Sampling in Computational Geometry, II", *Discrete and Computational Geometry*, vol. 4, 1989, pp. 387–421.

B. Chazelle and H. Edelsbrunner, "An Optimal Algorithm for Intersecting Line Segments in the Plane", *Journal of the Association for Computing Machinery*, vol. 39, No. 1, Jan. 1992, pp. 1–54.

*Primary Examiner*—Almis R. Jankus

[57] ABSTRACT

The present invention provides a technique for mapping the intersections of line segments to machine representable points in a tiled plane. The technique provides for two mapping rules with respect to intersections that result in dividing an original line segment into a number of line segment fragments, each of which is an output machine representable line segment. The mapping rules are designed to minimize the fragmentation of an output set of machine representable line segments while still maintaining their topological consistency and geometric accuracy (i.e., closeness) with respect to the corresponding set of original input line segments. The technique provides a way for operations that manipulate line segments to be implemented in a simple manner assuming a finite precision model of computer arithmetic. Such techniques have numerous applications in the field of computer graphics including, but not limited to, hidden surface elimination, set operations on polygons, and the decomposition of complex polygons into simpler components, such as triangles, trapezoids, or monotone regions.

4 Claims, 7 Drawing Sheets

METHOD FOR MAPPING LINE SEGMENT INTERSECTIONS TO MACHINE REPRESENTABLE POINTS

CROSS REFERENCE TO OTHER APPLICATIONS

This regular application claims priority from application Ser. No. 60/009,418, which is a provisional application filed on Dec. 29, 1995 by the same inventor and having the same title as the present application. The present invention is related to an invention that is the subject matter of a concurrently filed, commonly assigned U.S. patent application having the application number and title: Appl. Ser. No. 08/581,669, "Dynamic Computation Of a Line Segment Arrangement Using Finite Arithmetic" now issused as U.S. Pat. No. 5,748,197 which is hereby incorporated by reference herein as if set out in full.

BACKGROUND OF THE INVENTION

The present invention relates generally to a processor-based technique in the field of computer graphics, and more particularly, to a technique for mapping line segment intersections to machine representable points such that the machine representable intersections are topologically consistent with and geometrically close to the original line segment intersections.

Many types of computer-implemented applications in the field of computer graphics model sets of intersecting line segments in a plane. Fundamental to the functions of interacting with and the visual display of objects modeled as sets of line segments is the problem of finding and correctly representing their intersections. This is a fundamental step for such problems as hidden surface elimination, set operations on polygons, and the decomposition of complex polygons into simpler components (such as triangles, trapezoids, or monotone regions.)

A set of line segments in a plane has certain geometric and topological properties as a result of the relationship among the line segments in the plane. The geometric properties include the positions of the line segments in the plane, typically specified by their endpoints, and the geometric definition of the edges; the topological information indicates the incidence and adjacency of the vertices and edges.

Algorithms that manipulate line segments may be characterized according to whether they are developed assuming an infinite precision or a finite precision model of computer arithmetic. With respect to such algorithms in general, it is customary to assume, unless specifically stated otherwise, that arithmetic operations are carried out with infinite precision, in what may be referred to as the continuous domain. The implementation of geometric algorithms on computer graphics systems, however, often must deal with the limited arithmetic precision of geometric computations. Rather than simply analyzing the errors introduced by the computer, it is often necessary to redesign the algorithms entirely, taking into account the finite resolution of the machine arithmetic, to handle potential errors such as degeneracies (e.g., coincident lines, or multiple lines sharing the same intersection.)

One potential result of errors produced when an algorithm developed using an infinite precision arithmetic model is implemented using finite precision arithmetic is that after manipulation the position of the intersections of the line segments may no longer be topologically consistent with their positions when they were originally received. For example, mapping an intersection of two line segments to a representable point may introduce additional intersections in the two line segments that are not actually present in the original spatial distribution of the lines. Repeated mapping of the location of an intersection of two line segments that results from finite precision computations could produce a final representation of the location of the intersection that is unacceptably distant from the actual location of the intersection of the original line segments, a problem that may be described as "drifting" of an output representable line segment. Depending on the nature and purpose for which the line segments are being used, these inconsistencies may have adverse real-world consequences to a user of an application that depends, for example, on accurately locating a point in a region formed by the intersecting line segments.

Algorithms manipulating line segments in the discrete domain have been suggested by Daniel H. Greene and Frances F. Yao, in "Finite-Resolution Computational Geometry," Proc. 27th Ann. Symp. on Foundations of Computer Science, 1986, pp. 143–152 (hereafter, "the Greene and Yao paper"). Greene and Yao disclose a technique for mapping the intersections in a set of line segments to machine representable points. Greene and Yao use a tiling of machine representable points, treating each representable point in a tile as an "obstacle," and do not allow segments to go over an obstacle while intersections move to their nearest machine representable point. The movement of the intersections causes additional line segments, called fragments, to be added to a line segment, and adhering to the obstacle rule results in adding more fragments to a line segment. Greene and Yao show that no topological inconsistencies arise between the original set of line segments and the fragmented line segments that result from using their technique. Greene and Yao disclose a three-pass algorithm for computing the machine representable intersections efficiently; this algorithm uses a discrete version of a well-known algorithm known as the plane sweep algorithm, in computing the machine representable intersections.

For many applications that handle significant numbers of line segments, the Greene-Yao mapping of intersections to representable points has the undesirable property of creating a large number of breaks in the original line segment in order to accommodate the requirement of not going over the obstacles. While these breaks produce line segments having machine representable intersections that are geometrically very close to the original line segments, they also produce very fragmented line segments, which has an adverse effect on the efficiency of algorithms and operations that use these fragmented line segments.

SUMMARY OF THE INVENTION

The present invention is based on the premise that many types of computer-implemented operations that use line segments require exact results from computations, requiring that line segment intersections be mapped to machine representable points. The present invention is also based on the observation that an operation for mapping line segment intersections to machine representable points must have at least two goals: the first is to keep the output line segments having representable intersections near in position to the original segments; this requirement is called the geometric accuracy requirement or the "closeness requirement". The second goal is to preserve as much as possible the topology of the original set of line segments; this is called the "topological consistency requirement." The further observation is made that these two goals typically impose conflicting requirements on a mapping operation that seeks to achieve them. The first goal suggests that each intersection in the original set of line segments be mapped to its nearest representable point. However, it is well known that just doing this can cause topological inconsistencies between the original and the output sets of line segments, thereby defeating achievement of the second goal. In the discussion of the present invention herein, the terms "near" or "close" when applied to line segment proximity refers to the maximum deviation permitted between an original (input) line segment and its corresponding line segment after mapping the intersections to representable points.

The present invention provides a technique for mapping all intersections of a set of line segments to representable points on a reference plane that has been tiled by translating a standardized geometric shape in a regular and repeating pattern. The standardized geometric shape includes a designated point, which is called the machine representable value. An intersection occurring anywhere within a tile is mapped to the tile's representable value. One consequence of this mapping is the breaking up of the original line segment into pieces, called fragments. In order to ensure that the resulting set of representable line segments has a topology consistent with the original set of line segments, additional points on line segments are mapped to the tiled plane as well. In particular, the mapping operation uses two rules: an intersection that falls within a tile is mapped to the machine representable point of the tile; and a third line segment passing through a tile that includes an intersection of first and second line segments or an endpoint of a line segment is mapped to the machine representable point of the tile. In the end, all intersections in the resulting set of machine representable line segments have machine representable values, and the fragmented line segments that result from the mapping operation are no more than the distance of one tile away from their corresponding original segments.

The technique of the present invention begins with a set of potentially intersecting line segments in the plane, and produces a new collection of line segments that do not intersect except at their endpoints. This is accomplished by breaking the original lines into multiple new line segments, collectively referred to as the fragmentation of the original line. The technique has at least two desirable properties:

1) The fragmentation of an original line is close to the original line. That is, if L, a line segment of the input, is fragmented into $M_1, M_2, M_3, \ldots M_K$, then every point on every $M_i$ is within distance $\epsilon$ (epsilon) of L.

2) The mapping operation preserves topology. In general terms that are explicitly illustrated below, this means that if three original lines intersect to form a triangle having a specific orientation with respect to a reference line segment, then the technique will preserve the triangle or collapse the triangle to a single point, the operation will not change the orientation of the triangle with respect to the reference line segment. In slightly more formal terms, let p be the endpoint of a segment $L_1$, or the intersection of two segments $L_1$ and $L_2$, and let r be the representable point near p. Then with respect to a third line segment $L_3$, either r is on the fragmentation of $L_3$, or the relationship of r to the fragmentation of $L_3$ preserves the relationship of p to $L_3$.

In accordance with the present invention, there is provided a method, implemented in a machine having a processor, for producing an output set of machine representable line segments using an input set of line segments including at least one pair of intersecting line segments. The method comprises receiving a set of input line segments and referencing coordinate data items indicating locations of points on each line segment to a tiled planar region having a plurality of tiles regularly distributed in a region of a plane. Each tile has a regular geometric shape and a location included within it referred to as a machine representable point in the coordinate system of the tiled planar region. A mapping operation is performed using the input set of line segments to produce the output set of machine representable line segments. The mapping operation includes determining a tile, referred to as an intersection tile, in the tiled planar region that includes within it either an intersection coordinate location of a pair of input intersecting line segments, or an endpoint of an input line segment. The intersection coordinate location of the pair of intersecting line segments is replaced with coordinate data indicating the machine representable point in the intersection tile. Replacing the intersection coordinate location with coordinate data indicating the machine representable point causes each one of the pair of input intersecting line segments to be divided into two fragment line segments, referred to as fragments, having a vertex at the machine representable point in the intersection tile; each fragment line segment produced by replacing the intersection coordinate location with coordinate data indicating the machine representable point is referred to as an output representable line segment.

The mapping operation further includes determining any nearby input line segments included in the set of input line segments that have a coordinate location within the boundary of the intersection tile. The coordinate location of such a nearby line segment is replaced with the coordinate data indicating the machine representable point in the intersection tile. Replacing the coordinate location of the nearby input line segment with the coordinate data indicating the machine representable point also causes the nearby input line segment to be divided into two fragments.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component acts.

BRIEF DESCRIPTION OF THE DRAWINGS

FIGS. 5A and 5B illustrate a principle of topological consistency of a set of line segments according to the present invention; FIG. 5A shows when topological consistency is maintained, and FIG. 5B shows when topological consistency is violated;

FIG. 6A shows when topological consistency is violated, and FIG. 6B shows when topological consistency is maintained;

DETAILED DESCRIPTION

The detailed description below is organized as follows: Section A provides a brief conceptual framework for understanding the environment of the invention. Section B provides a description of the general features of the invention. Section C provides a description of the machine environment of the present invention and a description of the invention implemented as part of a software product.

A. Conceptual Framework

The present invention relates to operating a machine or system including a processor, and to processing electrical or other physical signals to produce other desired physical signals. The detailed description which follows is presented largely in terms of symbolic representations of operations of data within the memory of the system. These operations require physical manipulations of physical quantities such as electrical or magnetic signals that are capable of being stored, transferred, combined, compared, and otherwise manipulated. For convenience, these physical signals will be referred to herein variously as bits, values, image locations, or pixels. Further, the operations performed on the signals, referred to in terms such as adding, comparing, or determining, while commonly associated with mental operations performed by a human user, are performed exclusively by a processor of a suitable machine, and require no human capability, apart from supplying, when appropriate, the initial input line segments. In addition, the algorithmic descriptions of the invention that are presented herein for operating the machine are not inherently related to any particular processor, machine, or other apparatus. The machine may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiment of the claimed invention illustrated in the accompanying drawings. These terms have the meanings indicated below throughout this specification and in the claims, rather than any meanings that may occur in other sources, such as, for example, documents, if any, that are incorporated by reference herein elsewhere in this description.

The term "data" or "data item" refers herein to physical signals that indicate or include information. "Data" includes data existing in any physical form, and includes data that is transitory or is being stored or transmitted. For example, data could exist as an electromagnetic or other transmitted signal or as a signal stored in electronic, magnetic, or other form. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, a coordinate data item indicates a location of a point on a line segment when the coordinate data item contains values of coordinates expressed in a coordinate system that specify the location of the point in the coordinate system.

A "processor" is any machine, component or system that can process data, and may include one or more central processing units or other processing components. Any two components of a machine or system are "connected" when there is a combination of circuitry that can transfer data from one of the components to the other. A processor "uses" data in performing an operation when the result of the operation depends on the value of the data. An "instruction" is an item of data that a processor can use to determine its own operation. A processor executes a set of instructions when it uses the instructions to determine its operation, and an "operation" results from the processor executing the set of instructions. Thus, a set of instructions may be considered to be an operation. To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

"Memory" is any component, combination of components, circuitry, or system that can store data, and may include local and remote memory and input/output devices. A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

Figure 1:
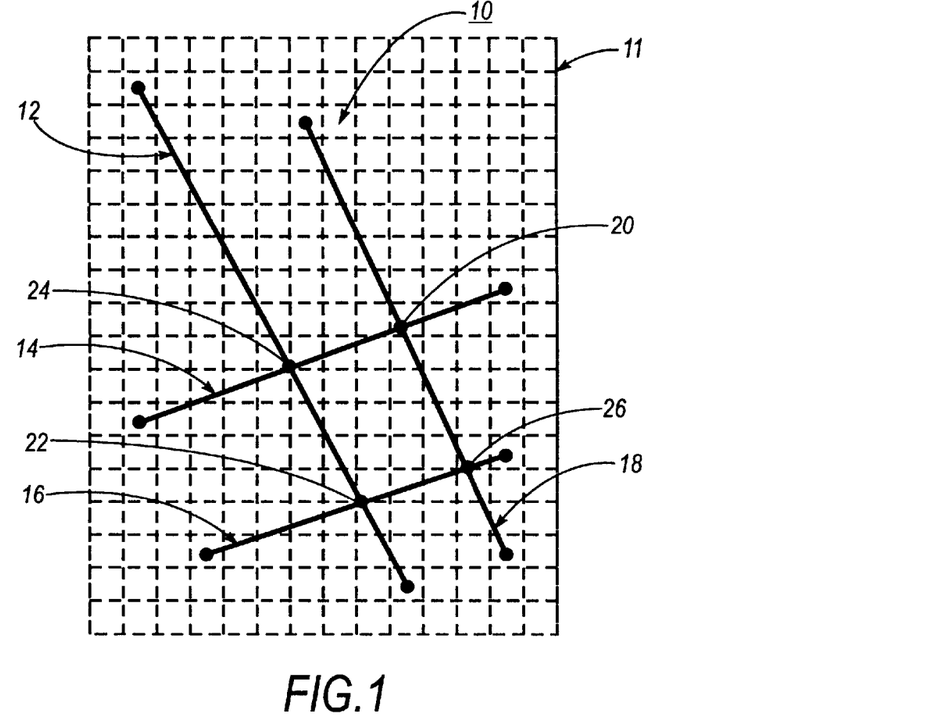
FIG. 1 illustrates a set of line segments and an associated grid of representable points in a Euclidian plane of the type that is suitable as input to the present invention for mapping line segment intersections to machine representable points.

FIG. 1 illustrates a set 10 of line segments 12, 14, 16 and 18 in a Euclidean plane. A line segment is specified by a data item that indicates a pair of coordinate values for each of its endpoints in the plane, using a conventional coordinate system. A line segment endpoint, such as endpoint 15, and a line segment intersection between a pair of line segments, such as intersections 24 and 26, may each be referred to as a "vertex."

Figure 2A:
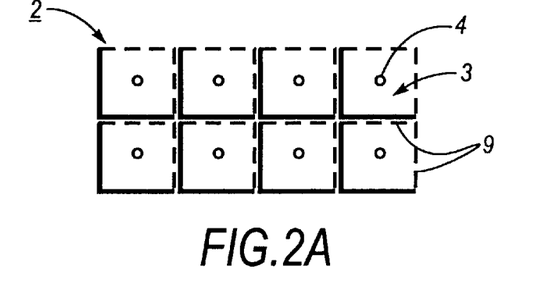
FIGS. 2A, 2B and 2C illustrate different types of tiling by translation and mapping to a machine representable point that may be used in implementing the line segment intersection mapping technique of the present invention.
Figure 2B:
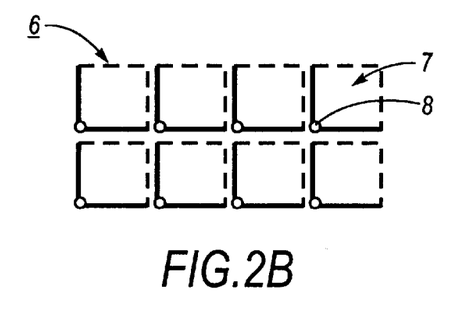
Figure 2C:
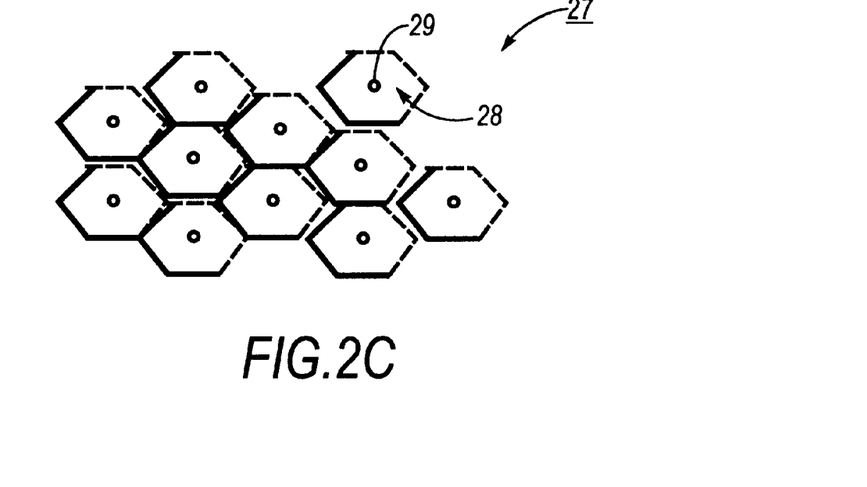

For purposes of the present invention, a "tile" is an area of a Euclidean plane having a regular convex geometric shape. "Tiling" an area of a plane by translation divides the area of the plane into a regular and repeated distribution of tiles where each point of the plane is in exactly one tile. Tiling an area of the plane by translation produces a "tiled planar region" of the plane. When the same single location in each tile is positioned on a machine representable coordinate in the coordinate system of the plane, that single location is referred to as the "machine representable point" or simply the "representable point" of the tile. Tiling by translation of tiles in the shape of unit squares produces a grid of equidistant machine representable points in the tiled planar region. FIGS. 2A, 2B and 2C illustrate three representative tilings of a portion of a plane. In FIG. 2A, a unit square 3 having a machine representable point 4 in its center is tiled by translation, producing a grid of equidistant machine representable points in the tiled planar region. Similarly, in FIG. 2B, a unit square 7 having a machine representable point 8 at its left lower corner is tiled by translation, also producing a grid of equidistant machine representable points in the tiled planar region. In FIG. 2C, a hexagonal tile 28 having a machine representable point 29 in its center is tiled by translation.

A point having real coordinates on a line segment, such as a vertex, is said to be "mapped to" a machine representable point when the real coordinates of the point are replaced by machine representable coordinates; a vertex that is mapped to a machine representable point may be referred to as a "machine representable vertex." A line segment that contains a machine representable vertex may be referred to as a "machine representable line segment." Similarly, "to map" a vertex means to replace its real coordinates with machine representable coordinates.

A "mapping operation" is one or more operations that takes as input either an input line segment or vertex or both and produces a machine representable vertex, the coordinate values of which are determined by the operation(s). A mapping operation may also be referred to as a "mapping scheme."

An "intersection tile" is a tile that contains an intersection point, or vertex, of two input line segments, or that contains an endpoint of a line segment. An intersection tile may also be referred to herein as a "hook," indicating that the machine representable point associated with the intersection tile, and the tile itself, behave as a capture mechanism for grabbing both intersections that occur in the tile and line segments that pass through the tile when an intersection occurs in the tile. To complete the metaphor of the "hook", the technique of the present invention then moves these "captured" intersections and line segments to the machine representable point in the intersection tile. In FIG. 1, there are four hooks indicating the four intersections 24, 20, 22, 26 shown, and there are eight (8) hooks indicating the endpoints of lines 12, 14, 16 and 18.

The location of a machine representable point in a tile determines the method by which vertices are mapped to machine representable vertices. For example, if the machine representable point is located at the center of the tile, as is shown in FIG. 2A mapping is accomplished by rounding values greater than or equal to 0.5 up to the next higher integer value, and rounding values less than 0.5 down to the next lower integer value; this rounding is referred to herein as a "conventional number rounding scheme." In another example, if the machine representable point is located at the lower left of the tile, as is shown in FIG. 2B, mapping is accomplished by truncating each numerical value of the coordinate location of the point to its whole integer value.

An "output set of machine representable line segments" for a given input set of line segments has all of its intersection points mapped to machine representable points; that is, each vertex in the output set of line segments is represented by a data item that indicates a pair of integer coordinate values indicating its location in the plane. A "fragment" is one of two line segments produced when an input line segment is divided as a consequence of performing a mapping operation.

B. General Features of the Invention
1. The Mapping Rules and Topological Consistency The mapping operation of the present invention includes a set of mapping rules that are mathematically provable as producing an output set of machine representable line segments of line segments that is topologically consistent with the arrangement of the original input line segments. These mapping rules will be described with reference to grid 11 in FIG. 1. Grid 11 represents a portion of the Euclidean plane that is tiled into unit squares. The plane is assigned coordinates so that tile centers have machine representable coordinates; the tile center is the a machine representable point. Note that a unit square is a particularly useful shape for a tile in many types of applications that might utilize the present invention, but the invention may accommodate any convex geometric shape that will tile the plane by translation.

Note that the tiling of the plane must also provide rules for assigning points that lie on the boundary of the tiles to only one tile. Tiling must insure that every point in the plane is covered once and only once. This can be accomplished by assigning a tile as having a closed interval at a first boundary, where all points falling on the first boundary are assigned to the tile, and as having an open interval at the opposite parallel boundary where all points falling on the opposite boundary are assigned to the next adjacent tile. Any suitable tiling scheme that assigns points that lie on the boundary of a tile to only one tile may be used. FIGS. 2A, 2B and 2C illustrate the concepts of open and closed intervals of a tile. In each of these figures, a part of each tile is shown in solid lines, indicating that when a line segment point or vertex falls on these lines, the line segment or intersection point is considered to occur in this tile. The rest of each tile is shown in dashed lines, indicating that when a line segment point or vertex falls on these dashed lines, the line segment or intersection point is considered to occur in the next tile. The tiles in each figure are shown slightly separated for illustration purposes, but are assumed to cover each point in the plane. And, as noted earlier, the point in each tile designated as the machine representable point has the same position in each tile.

The first mapping rule states that when an input line segment passes through a hook, it is mapped to pass through that hook's machine representable point. The second mapping rule states that when a vertex occurs within the boundary of a tile, the tile is a hook, and the vertex is mapped to the machine representable point of the hook. The rules provide that a fragment is added to an input line segment only where a vertex in the input set of line segments lies on the segment, or where the input line segment passes "near" a machine representable point which either is or will become a vertex of the output set of machine representable line segments, where "near" is defined as being within the boundary of the hook.

Figure 3:
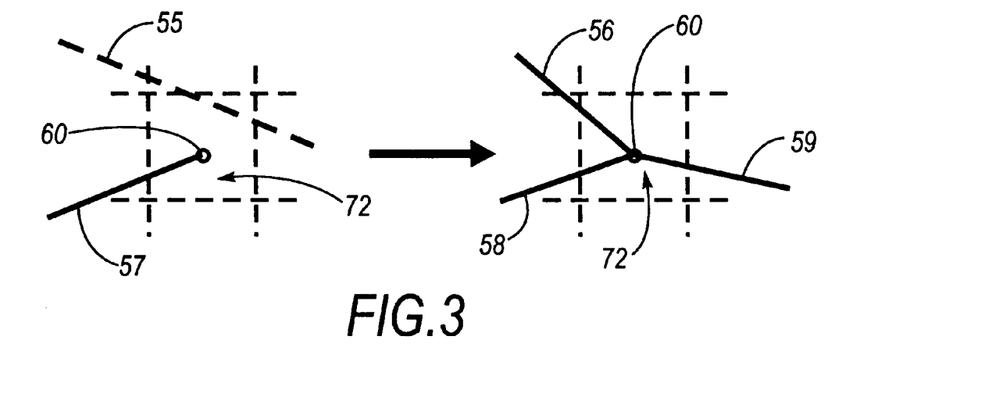
FIG. 3 illustrates the first of two rules for mapping vertices to machine representable points according to the present invention.

FIGS. 3 and 4 illustrate the two mapping rules. Each figure shows a portion of grid 11 enlarged, with a machine representable point in a tile represented as a small, unfilled circle. With reference to FIG. 3, the left side of FIG. 3 shows two input line segments 55 and 57, represented as dashed lines, in a portion of grid 11 that includes tile 72; input line segment 57 terminates in tile 8 at machine representable point 60, such that tile 72 includes a vertex (the endpoint), thus making tile 72 a hook; input line segment 55 passes through the hook. The right side of FIG. 3 shows the result of applying the first rule. The rule results in input line segment 55 being divided into two fragments 56 and 59 of what is now a fragmented line segment, shown in solid lines; this is required in order to map input line segment 55 to machine representable point 60. The machine representable vertex produced by mapping line segment 55 now has the integer coordinates specified by machine representable point 60.

Figure 4:
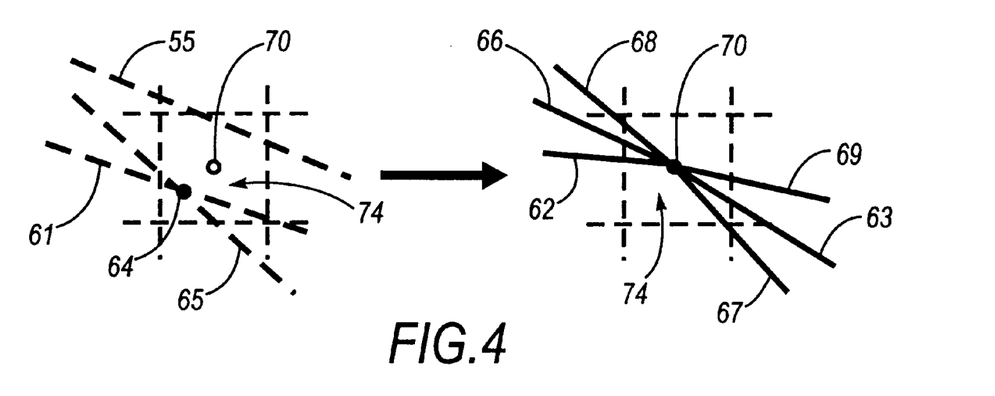
FIG. 4 illustrates the second of two rules for mapping vertices to machine representable points according to the present invention.

FIG. 4 illustrates both mapping rules applied to a hook that contains an intersection of two input line segments and an input line segment that passes through a tile containing an intersection. The left side of FIG. 4 shows three input line segments 55, 61 and 65 in a portion of grid 11 that includes tile 74; the input line segments are all shown as dashed lines. Tile 74 contains machine representable point 70. Input line segments 61 and 65 intersect in tile 9 at vertex 64, thus making tile 74 a hook; input line segment 55 passes through tile 74. The right side of FIG. 4 shows the result of applying the mapping rules to input line segments 55, 61 and 65. As in FIG. 3, input line segment 55 is divided into two fragments, labeled 68 and 69, of what is now a fragmented line segment. Vertex 64 formed by the intersection of input line segments 61 and 65 is shown mapped to machine representable point 70 on the right side of FIG. 4. This results in each input line segment being divided into fragments; input line segment 61 is divided into fragments 62 and 63, and input line segment 65 is divided into fragments 66 and 67.

This mapping scheme produces fragmented line segments that are always within one tile of their corresponding input line segment. Since the mapping of an input line segment happens by routing it to pass through the centers of the hooks it crosses, no point of the input line segment is mapped by more than a tile, and it follows that the whole input line segment is never more than the distance of a tile away from its associated fragmented line segment. Put another way, a fragment is always within a distance of $1/\sqrt{2}$ (square root of 2) times the length of the side of a tile from its input line segment. Thus, the mapping scheme provides a degree of geometric accuracy, or "closeness" that is sufficient for a large range of applications.

The mapping rules of the present invention may be proven mathematically to show that an output set of machine representable line segments is topologically consistent with the original set of input line segments. Generally, topological consistency has to do with the orientation of vertices in the set of line segments with respect to a reference line segment. A vertex is said to have an original orientation in the plane with respect to a reference line segment. For example, if a vertex has an original position to the left of a line segment in a plane, if the vertex crosses over the line segment such that its new position is to the right of the line segment, the vertex has changed orientation with respect to the reference line segment. An output set of machine representable line segments is "topologically consistent" with a set of input line segments when each machine representable vertex retains the same orientation with respect to any particular fragmented line segment as the corresponding input vertex has with respect to the corresponding input line segment.

FIGS. 5A and 5B, and 6A and 6B illustrate general principles of topological consistency. In each of these figures, original input line segments are shown in dashed lines before mapping to machine representable points, and the output fragmented lines are shown as solid lines.

Figure 5A:
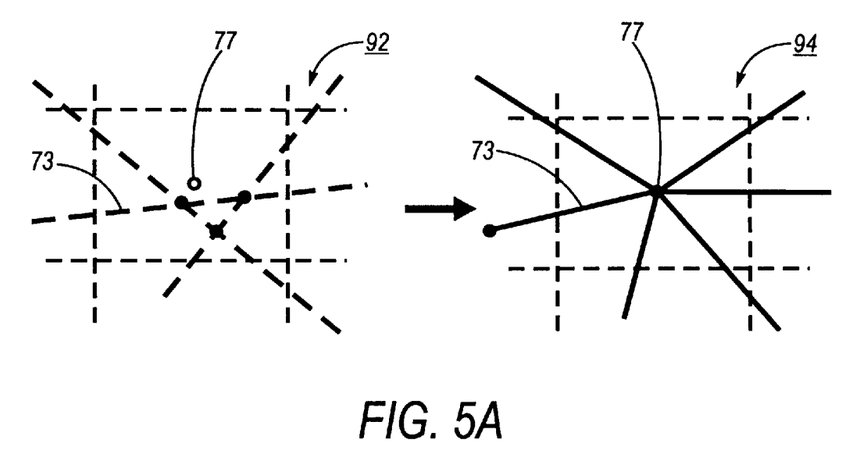
Figure 5B:
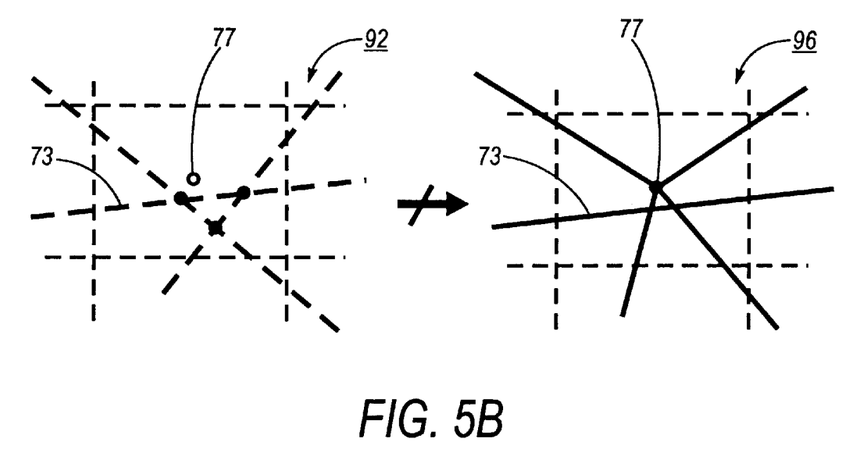

FIGS. 5A and 5B illustrate acceptable and unacceptable behavior for a set 92 of three input line segments (on the left sides of FIGS. 5A and 5B) that intersect each other, forming a downward pointing triangle. Result 94 on the right side of FIG. 5A shows all three line segments intersecting machine representable point 77, with the result that the downward pointing triangle has collapsed into a single vertex. This is an acceptable mapping result that preserves topological consistency between the original set 92 of line segments and the result 94. In FIG. 5B, the same set 92 of three line segments is present; result 96 shows only two of the line segments mapped to machine representable point 77; line segment 73 is not mapped to a machine representable point, according to the mapping scheme implemented in FIG. 5B. This results in the downward pointing triangle present in the original set 92 of line segments inverting to an upwardly pointing triangle in result 96. The output set of line segments shown in result 96 is topologically inconsistent with set 92 of original line segments because the orientation of a vertex of the set 92 of line segments in relation to line segment 73 has changed.

Figure 6A:
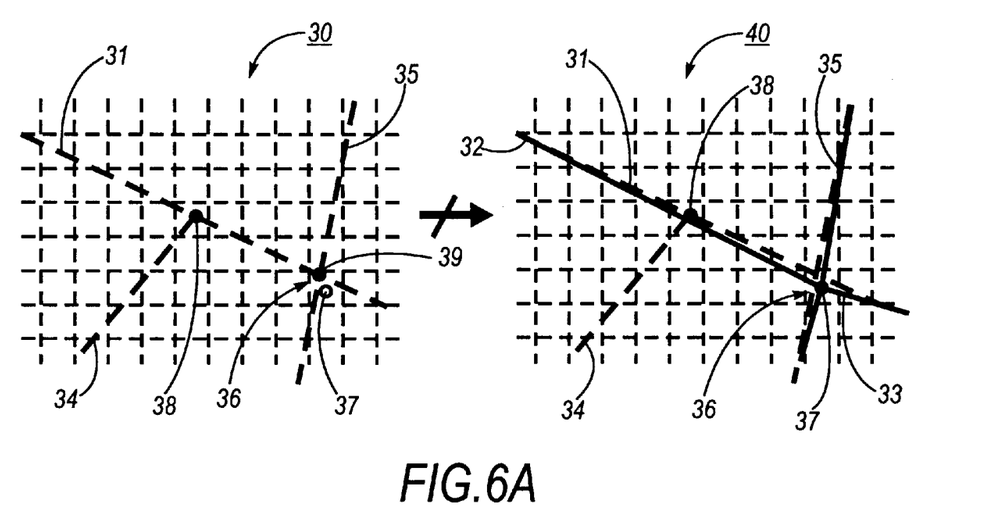
FIGS. 6A and 6B illustrate a second aspect of the principle of topological consistency of the line segment intersection mapping technique according to the present invention.

FIGS. 6A and 6B show two different behaviors representing two types of mappings of line segments with respect to a vertex that is an endpoint. The mapping shown in FIG. 6A produces an unacceptable result. The left side of FIG. 6A shows line segment arrangement 30 including input line segment 34 having endpoint 38 at a machine representable point near but not intersecting with input line segment 31. Third line segment 35 intersects line segment 31 in tile 36 at intersection point 39. Line segment arrangement 40 on the right side of FIG. 6A shows the result of mapping the intersection of line segments 31 and 35 to machine representable point 37 in tile 36: both line segments 31 and 35 are broken into line segment fragments as the intersection is mapped to representable point 37. The mapped line segments are shown in solid lines, and the original input lines are shown in dashed lines. In particular, line segment 31 is broken into fragments 32 and 33. It can be seen that leftmost fragment 32 of line segment 31 has moved downward; the portion of line segment fragment 32 that passes through the tile containing endpoint 38 of line segment 34 crosses over endpoint 38, and now intersects with line segment 34; this occurs as a result of the fragmentation of line segment 31. This illustrates the concept of line segment drifting. This is a topologically inconsistent and unacceptable result; the orientation of the endpoint of line segment 34 has changed with respect to input line segment 31. The mapping scheme illustrated in FIG. 6A produces a topologically inconsistent output set of machine representable line segments.

Figure 6B:
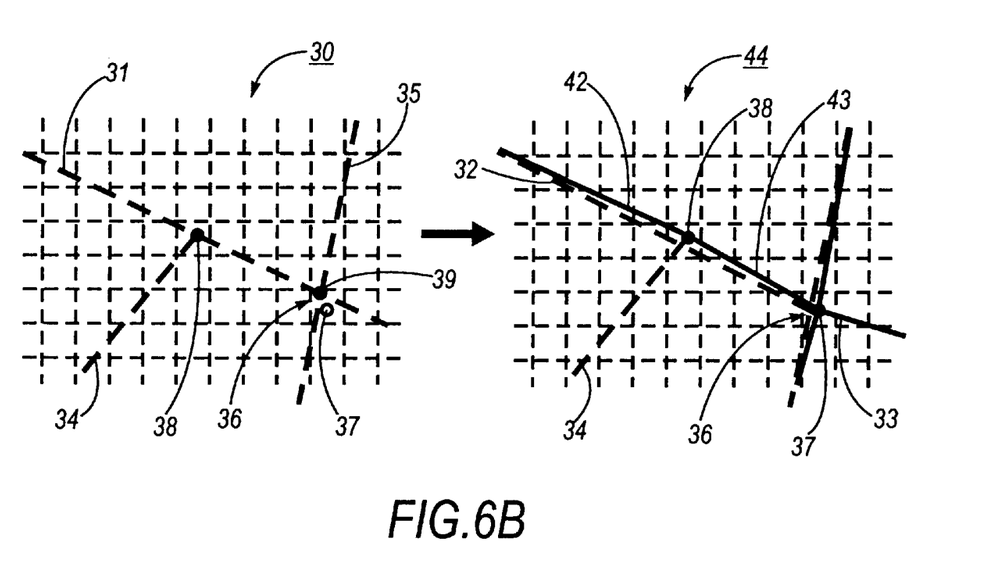

FIG. 6B shows the mapping operation of the present invention which produces acceptable behavior for a line segment with respect to a vertex that is an endpoint. The left side of FIG. 6B shows the same arrangement 30 of input line segments 31, 34 and 35 as shown in FIG. 6A. Line segment arrangement 44 on the right side of FIG. 6B shows the result of the mapping operation: line segment 31 is again fragmented so that fragments 43 and 33 share a vertex at machine representable point 37. In addition, the tile containing endpoint 38 of line segment 34 is treated as a hook and since line segment 31 passes through the hook, the portion of the line segment that is fragment 32 in arrangement 40 of FIG. 6A is broken into fragments 42 and 43 having adjacent endpoints mapped to the representable point of endpoint 38. It can be seen that, while this introduces another line segment fragment into the arrangement, this mapping scheme does not cause line segment 31 to cross over line segment 34 as the mapping scheme did in arrangement 40 of FIG. 6A. Arrangement 44 is a topologically consistent and acceptable result because line segment 31 still has the same orientation with respect to endpoint 38 of line segment 34 that it had before line segment 31 was fragmented and mapped to machine representable points. Note that while the machine representable fragments of original segments 31 and line segment 34 are no longer separated, the collapsing of this feature (i.e., the separation) in the set of line segments is permitted within the definition of topological consistency.

2. Description of the Mapping Technique

The technique of the present invention does not depend on the specific method used to map computed intersections to nearby representable points (e.g., rounding or truncation), but it does depend on this mapping being systematic in a way that can be abstracted as a tiling. Thus, in formal terms, this can be described as follows: Let C be a convex region that will tile the infinite plane by translation, and let r be a designated point in that region. The copies of r in the infinite tiling of the plane are the representable points, and C determines how results are mapped to these points. It is assumed that the endpoints of the input line segments are given as representable points (that is, they lie on copies of r). For example, the use of truncated integer arithmetic would result in a C that is a unit square, open above and to the right, with r the lower left hand corner, as shown in FIG. 2B. By contrast, rounded arithmetic would locate r in the center of C, as shown in FIG. 2A.

The technique can be described as follows: Let E be the set of endpoints of the input line segments. Compute I, the set of intersections of the line segments, by including r in I whenever two line segments intersect in the region C containing r. This first pass is a routine intersection of line segments; however, to obtain the desirable topological consistency properties, some additional intersections are also found. Let H (the hooks) be the union of E (the endpoints) and I (the intersections), and for each input line segment L determine when L crosses the region C for a point in H, and break L into segments at these representations of H. Finally, duplicate coincident line segments are removed and the resulting output set of machine representable line segments is produced.

The technique of the present invention is independent of the method used to compute I, the set of intersections of the original line segments, and is independent of what technique is used to determine when L crosses the region C for a point in H. Techniques such as plane sweep or quad tree subdivision can be used to find these intersections.

Figure 7:
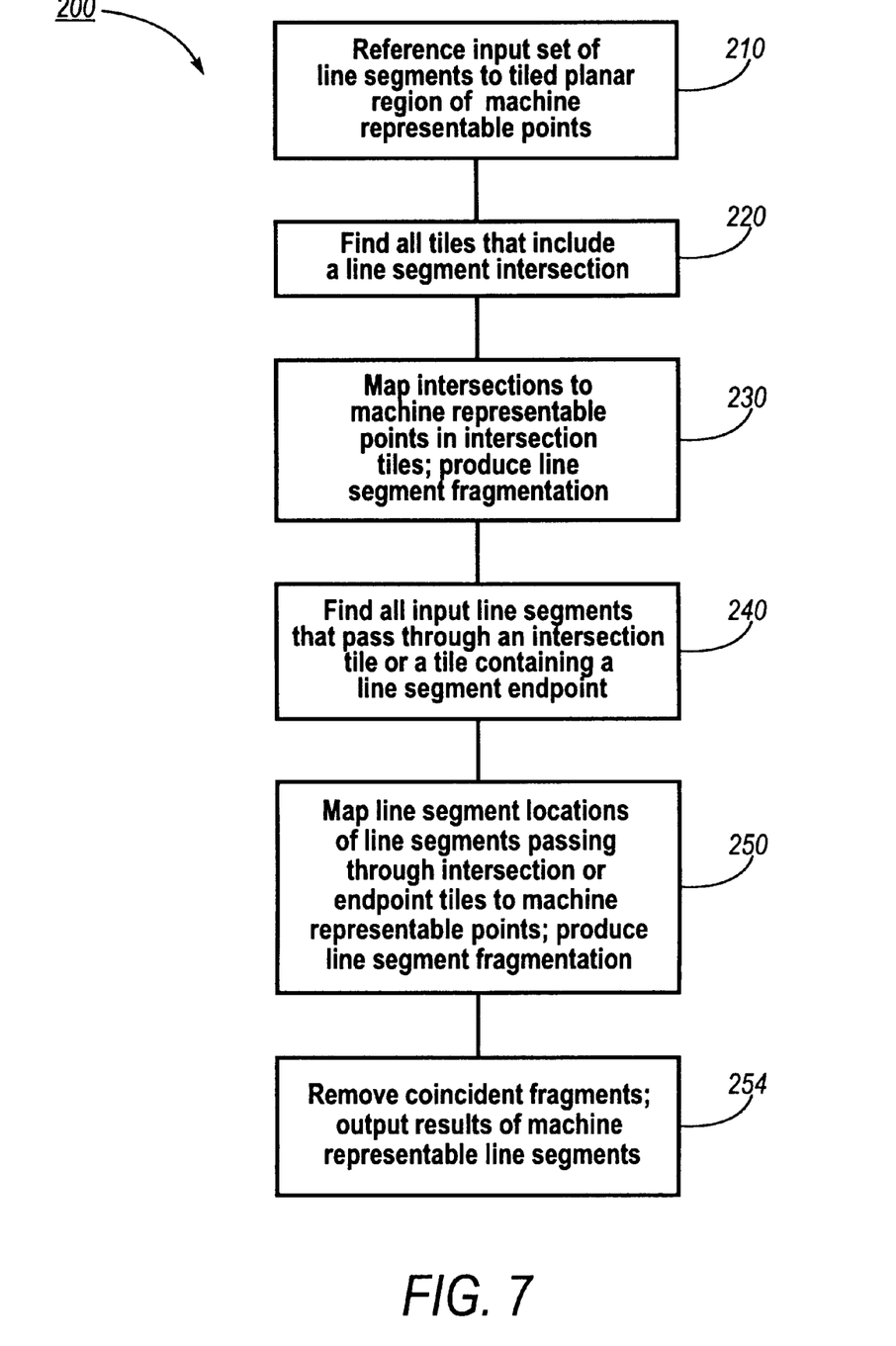
FIG. 7 is a flowchart showing the processing operations for mapping line segment intersections to machine representable points according to the present invention.

FIG. 7 is a flowchart illustrating the general steps of technique 200 of the present invention as described above and as implemented in a processor-controlled machine. Locations of points on each line segment in an input set of line segments is referenced, in box 210, to the coordinate system of a tiled planar region of machine representable points.

Next, in box 220, all of the tiles are found that include an intersection location of a pair of input intersecting line segments. The coordinates of the intersection location are mapped, in box 230, to coordinate values indicating the respective machine representable point of the tile including the intersection, thereby producing a fragmentation of each line segment in the pair of input intersecting line segments. Each fragment of this fragmented line segment is referred to as an output representable line segment.

Next, a third input line segment is determined, in box 240, in the input set of input line segments that has a coordinate location within the boundary of the intersection tile or within the boundary of a tile including an endpoint of an input line segment. The coordinate location of this third line segment is mapped, in box 250, to coordinate values indicating the machine representable point in the intersection or endpoint tile, also causing fragmentation of the third input line segment. Coincident line segments are removed, in box 254, before producing the output set of machine representable line segments.

Figure 8:
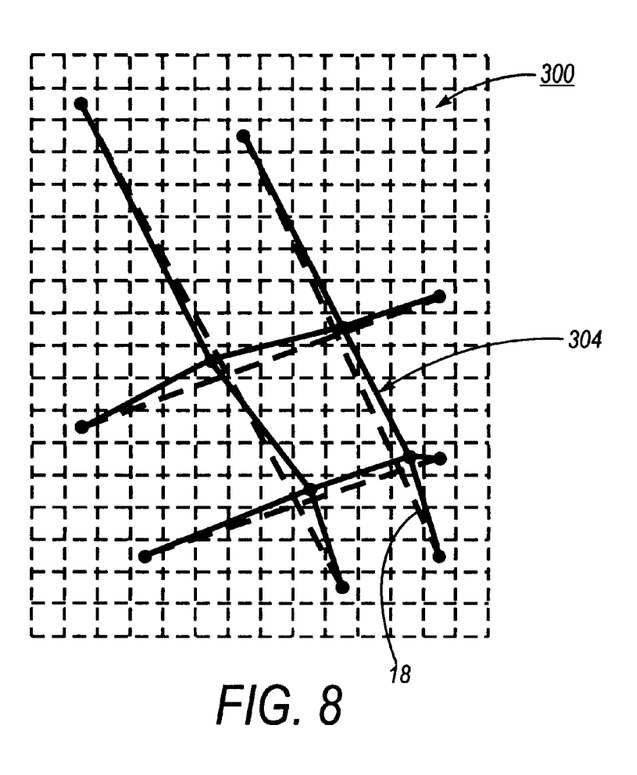
FIG. 8 illustrates a set of output machine representable line segments produced by applying the technique of the present invention to the set of line segments in FIG. 1.

FIG. 8 shows the set of input line segments from FIG. 1 in their machine representable form as set 300 of machine representable line segments. Input line segments are shown in dashed lines; output representable line segments are shown in solid lines. It is important to note that the line segment intersection mapping technique of the present invention produces fewer fragments in the set of machine representable line segments than the earlier Green-Yao mapping method discussed above. In the present technique, line segments are allowed to cross over a representable point in any non-intersection or non-endpoint tile while being fragmented, as long as the two mapping rules illustrated in FIGS. 3 and 4 are followed. In the earlier work, a line segment fragment would need to be created any time a line segment reached an "obstacle." So, for example, the Greene-Yao mapping technique would create a fragment in tile 304 because line segment 18 is moving over the center of that tile as it is being fragmented. The present technique does not impose this requirement and thereby generates fewer fragments. This can be of critical significance to the efficiency of an application that operates on thousands of line segments.

Figure 9:
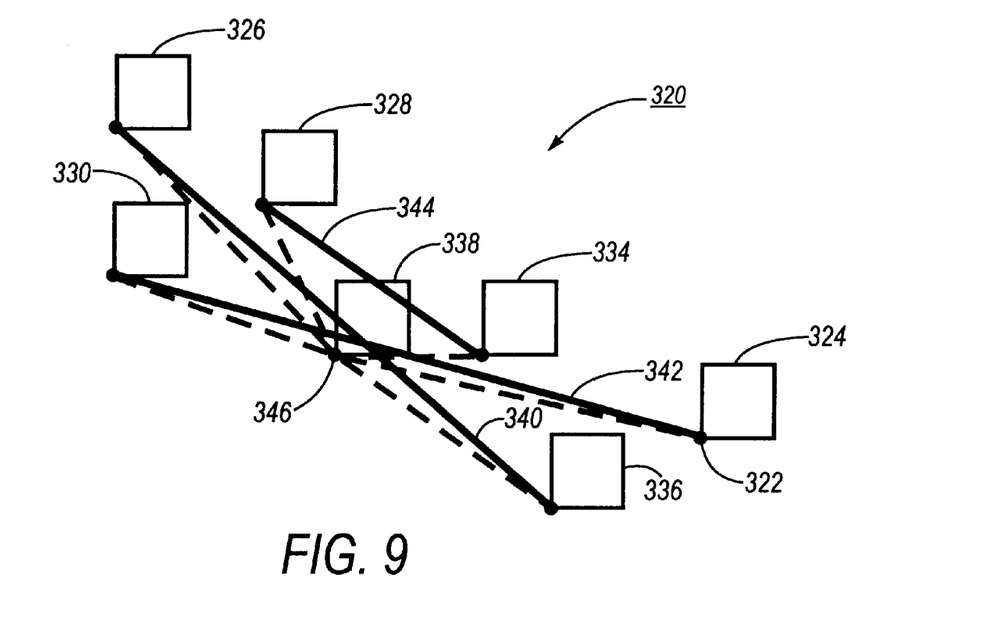
FIG 9 illustrates another set of input line segments and their corresponding output machine representable line segments using a unit square tiling system having representable points indicating truncation of line segment intersection values to machine representable points.

FIG. 9 shows another example of the technique using truncated arithmetic on a set 320 of three input line segments, where line segments 340 and 342 intersect. The elements of H, the hooks, are shown as small filled circles 322 in the lower left hand corners of small squares representing the element's enclosing convex regions 324 (tiles). The original input line segments are shown in bold; the output machine representable line segments are shown as dashed lines. Tiles 324, 326, 328, 330, 334 and 336 are endpoint tiles, and tile 338 is an intersection tile. Line segment 344 is mapped to machine representable point 346 as is the intersection of line segments 340 and 342.

3. An Implementation of the Present Invention

An implementation of the present invention has been written in the C programming language and executed on a Sun SparcStation computer available from Sun Microsystems of Mountain View, Calif. A description of an implementation of a variation of the present invention may be found in L. Guibas and D. Marimont, "Mapping Arrangements Dynamically," in Proceedings of the 11th ACM Symposium on Computational Geometry (SCG '95), Vancouver, B. C., June, 1995 which is hereby incorporated by reference herein as if set out in full. This implementation is further described in U.S. patent Appl. Ser. No. 08/581,669, entitled "Dynamic Computation Of a Line Segment Arrangement Using Finite Arithmetic" now issused as U.S. Pat. No. 5,748,197.

C. The Machine and Software Product of the Invention

1. The Machine of the Present Invention

Figure 10:
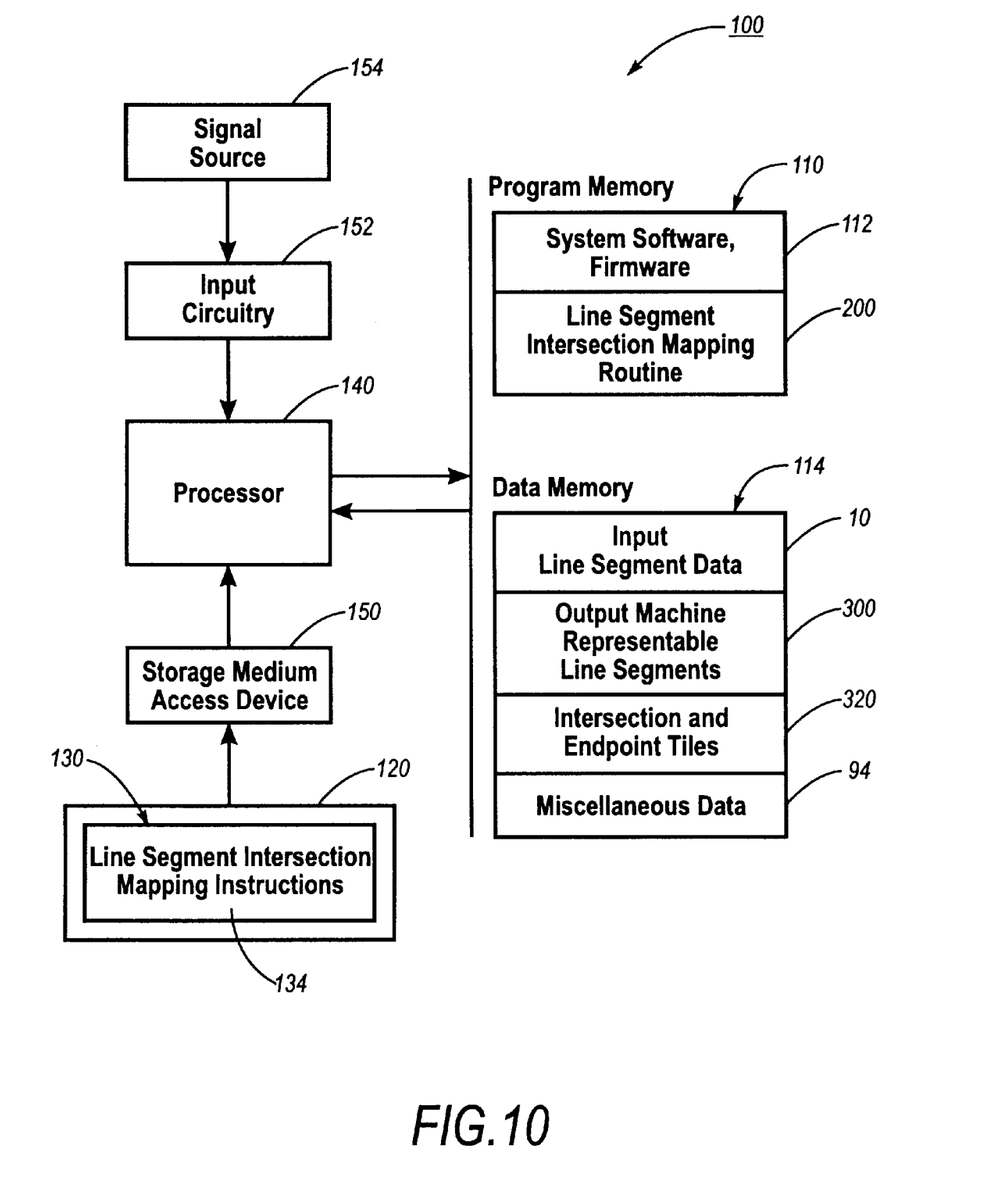
FIG. 10 is a simplified block diagram illustrating a machine in which the line segment intersection mapping technique of the present invention may be used, and a software product that stores instruction data for implementing the present invention on the machine.

FIG. 10 is a block diagram of a generalized, processor-controlled machine 100. The present invention operates any machine having the common components, characteristics, and configuration of machine 100 illustrated in FIG. 10. For example, machine 100 may be a general purpose computer, a special purpose computer optimized for the types of operations performed by the present invention, or a combination of a general purpose computer and auxiliary special purpose hardware. The machine configuration illustrated at this high level is a known configuration. However, a machine such as machine 100 suitably programmed to embody the present invention is not a standard or known configuration.

An input signal source device 154 provides signals indicating input line segment data. These input signals are forwarded via input circuitry 152 to processor 140 and may be stored in data memory 114. Processor 140 may be included in any well-known device, such as a general purpose computer, configured according to the present invention. In response to an initiation signal, processor 140 performs the general operations indicated in FIG. 7, producing an output set of machine representable line segments which may be stored in data memory 114, or in any other suitable storage device, or it may be output to a destination device (not shown) such as a printer or display.

Processor 140 operates by accessing program memory 110 to retrieve instructions, which it then executes. Program memory 110 includes line segment mapping instructions 200 that implement the invention described in the flowchart of FIG. 7. Program memory 110 includes instructions for any subroutines needed to implement the invention according to instructions 200. During execution of the instructions, processor 140 may access data memory 114 to obtain or store data necessary for performing line segment intersection mapping. Data memory 114 stores the input set of line segments and various other miscellaneous data 94, including, for example, the list of intersection hooks produced by operation 220 of FIG. 7 when machine 100 implements the present invention.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility.

2. The Software Product of the Present Invention

FIG. 10 also shows software product 120, an article of manufacture that can be used in a machine that includes components like those shown for machine 100. Software product 120 includes data storage medium 130 that can be accessed by storage medium access device 150. Software product 120 may be commercially available to a consumer in the form of a shrink-wrap package that includes data storage medium 130 and appropriate documentation describing the operation of the software product. In that case, a data storage medium is a physical medium that can store data. Examples of data storage media include magnetic media such as floppy disks and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples of storage medium access devices include floppy disk drives and CD-ROM readers.

Software product 120 may also be stored on a remotely-located storage device, such as a server, and may be commercially available to a purchaser in the form of a data stream indicating instructions for carrying out the present invention that are transmitted to the consumer over a communications facility from the remotely-located storage device. In the latter case, article 120 and data storage medium 130 are embodied in physical form as the remotely-located storage device; the consumer purchases a copy of the contents of data storage medium 130 (i.e., instruction data 134 described in more detail below), but typically does not purchase the actual remotely-located storage device. When software product 120 is provided in the form of a data stream transmitted to the consumer over a communications facility from the remotely-located storage device, the data stream (including instruction data 134) is stored in some suitable memory device of machine 100, which might be program memory 110, or a data storage medium locally accessible to machine 100, which would then be accessible using storage medium access device 150.

Data storage medium 130 stores instruction data 134 which is provided to processor 140 for execution when the technique of the present invention is to be carried out. Note that data storage medium 130 in FIG. 10 may store other instruction data for other operations that are used in conjunction with the present invention. The stored data include data indicating line segment intersection mapping instructions 134; when these instructions are provided to processor 140, and processor 140 executes them, the machine is operated to perform the operations for mapping intersections of line segments to machine representable points, as represented in the flowchart of FIG. 7.

It can be seen from the foregoing discussion that the method and software product of the present invention provide a mapping operation that produces a set of machine representable line segment intersections that is topologically consistent with the corresponding set of original line segment intersections. The mapping operation meets the goals of keeping each of the output machine representable line segments near its corresponding original input line segment, and of preserving topological consistency between the sets of input and machine representable line segments.

While this invention has been described in conjunction with at least one illustrated embodiment thereof, the description was not intended to limit the invention to the embodiment or embodiments illustrated. It is evident that many alternatives, modifications and variations will be apparent to those skilled in the art. Accordingly, the invention as herein described is intended to embrace all such alternatives, modifications and variations that fall within the scope of the appended claims.

What is claimed:

1. A method for operating a processor-controlled machine to produce an output set of machine representable line segments using an input set of input line segments including at least one pair of intersecting input line segments; the method comprising:

receiving an input set of intersecting input line segments, and referencing coordinate data items indicating locations of points on each line segment to a tiled planar region having a plurality of tiles regularly distributed in a region of a plane; each tile having a regular geometric shape and a location included therein referred to as a machine representable point having finite precision coordinates in the coordinate system of the tiled planar region; and performing a mapping operation using the input set of input line segments to produce the output set of machine representable line segments; the mapping operation including, determining a tile, referred to as an intersection tile, in the tiled planar region including therein an intersection coordinate location of a pair of first and second input intersecting line segments;

replacing the intersection coordinate location of the pair of first and second input intersecting line segments with coordinate data indicating the machine representable point in the intersection tile; replacing the intersection coordinate location with coordinate data indicating the machine representable point causing each one of the pair of input intersecting line segments to be divided into two fragment line segments each having a vertex at the machine representable point in the intersection tile;

determining a third input line segment in the input set of input line segments having a coordinate location within the boundary of the intersection tile or within the boundary of an endpoint tile including an endpoint of an input line segment; and replacing the coordinate location of the third input line segment with the coordinate data indicating the machine representable point in the intersection tile or in the endpoint tile; replacing the coordinate location of the third input line segment with the coordinate data indicating the machine representable point causing the third input line segment to be divided into two fragment line segments;

the mapping operation allowing any one of the fragment line segments to pass close to or over a machine representable point in a non-intersection or non-endpoint tile without replacing a coordinate location on the fragment line segment with the coordinate data indicating the machine representable point in the non-intersection or non-endpoint tile and without further subdividing the fragment line segment into two fragment line segments in the non-intersection or non-endpoint tile.

2. The method of claim 1 wherein the tile in the tiled planar region has a shape of a unit square.

3. The method of claim 1 wherein the machine representable point is positioned in the center of each tile in the tiled planar region; and wherein replacing a coordinate location of a point on an input line segment with coordinate data indicating the machine representable point in the tile maps each numerical value of the coordinate location of the point on an input line segment according to a conventional number rounding scheme.

4. The method of claim 1 wherein the machine representable point is positioned at the lower left corner of each tile in the tiled planar region; and wherein replacing a coordinate location of a point on an input line segment with coordinate data indicating the machine representable point in the tile truncates each numerical value of the coordinate location of the point on an input line segment to its whole integer value.

* * * * *